(12) United States Patent
Powell

(10) Patent No.: US 7,563,003 B2
(45) Date of Patent: Jul. 21, 2009

(54) DROP-IN HIGH INTENSITY DISCHARGE LAMP ASSEMBLY AND RETROFIT METHOD

(75) Inventor: John Eddie Powell, Newport, NH (US)

(73) Assignee: Luminescent Systems, Inc., Lebanon, NH (US)

( * ) Notice: Subject to any disclaimer, the term of this patent is extended or adjusted under 35 U.S.C. 154(b) by 9 days.

(21) Appl. No.: 11/549,975

(22) Filed: Oct. 17, 2006

(65) Prior Publication Data

US 2007/0091607 A1   Apr. 26, 2007

(51) Int. Cl.
*F21V 23/02* (2006.01)
(52) U.S. Cl. .................. 362/265; 362/263; 362/519; 362/470; 313/25; 315/56
(58) Field of Classification Search ............ 313/25, 313/113, 318.11; 315/56, 58; 362/257, 263, 362/265, 470, 519, 659
See application file for complete search history.

(56) References Cited

U.S. PATENT DOCUMENTS

| 3,040,172 | A | 6/1962 | Chan |
| 4,437,142 | A | 3/1984 | Donato et al. |
| 6,111,359 | A | 8/2000 | Work et al. |
| 6,313,570 | B1 | 11/2001 | Bergkvist et al. |
| 6,376,992 | B1 | 4/2002 | Petrick |
| 6,501,231 | B1 | 12/2002 | Hyland et al. |
| 6,744,210 | B2 * | 6/2004 | Petrick ................. 315/56 |
| 6,781,318 | B2 | 8/2004 | Lapatovich et al. |
| 7,244,047 | B2 * | 7/2007 | Powell ................ 362/263 |
| 2006/0126334 | A1 | 6/2006 | Powell |
| 2006/0158078 | A1 | 7/2006 | Linssen et al. |

* cited by examiner

*Primary Examiner*—Stephen F Husar
(74) *Attorney, Agent, or Firm*—Vincent K. Gustafson; Intellectual Property/Technology Law

(57) ABSTRACT

A retrofit HID lamp assembly adapted for use in a non-HID lighting receptacle includes in one embodiment: (1) a housing compatible in size and shape with the receptacle; (2) a ballast unit disposed substantially within the housing interior; (3) a base terminal structure receiving electrical inputs and communicatively coupled to the ballast unit; (4) an aperture-defining reflector disposed within the housing; a lens bounding a reflector cavity; and an HID lamp having a light emissive portion that is removably insertable through the reflector aperture into the reflector cavity, and having a base portion that is electrically coupleable with the ballast unit. Fabrication and retrofit method are further provided.

42 Claims, 8 Drawing Sheets

FIG._4

DROP-IN HIGH INTENSITY DISCHARGE LAMP ASSEMBLY AND RETROFIT METHOD

STATEMENT OF THE RELATED APPLICATION(S)

This application claims benefit of U.S. patent application Ser. No. 11/010,606 filed on Dec. 13, 2004 in the name of inventor John E. Powell.

BACKGROUND OF THE INVENTION

1. Field of Invention

The present invention generally relates to high intensity discharge (HID) lamps and more specifically to a drop-in HID lamp assembly and retrofit method of deploying same, e.g., in aircraft lighting applications.

2. Brief Description of the Related Art

In the field of aircraft lighting, a wide variety of lighting elements and fixtures have been employed for interior (cabin) as well as exterior lighting applications.

Among the lights employed in exterior aircraft lighting systems, landing lights and taxi lights are particularly critical for safety and operability of the aircraft.

Conventional commercial passenger aircraft such as the Boeing 737, 747 and 777 (The Boeing Company, Chicago, Ill.) and many Airbus jetliners (Airbus S.A.S., Toulouse, France) use a common 28 volt 600 watt incandescent halogen Parabolic Aluminized Reflector (PAR) 64 lamp (Part No. Q4559X or Part No. Q4559XX) for landing and taxi lights. In incandescent PAR lamps, the bulb and reflector are encased in a glass housing, with the entire lamp ranging from M16 to PAR 64, and beam patterns ranging from Aircraft Landing (ACL) at the narrow end to very wide. Lamps are measured in increments corresponding to ⅛ inch (e.g., A PAR 36 is 36 times one eighth inch or 4½" in diameter). Typical output of incandescent halogen PAR lamps for such aircraft lighting applications is in the vicinity of 700,000 candelas (cd) with a 10×12 (spot) angle.

A significant deficiency of such PAR 64 lamps is their short service life, which in typical aircraft exterior lighting applications is on the order of 10-20 hours. The failure mode of such lamps is almost invariably associated to cracked lenses or filament failure.

Change-out of failed PAR 64 lamps, as a result of their short operating life, represents a major maintenance issue, since such lighting is intended for continuous functioning during night or low visibility conditions.

There is therefore a need in the art for aircraft taxi and landing lights that provide long service life and are readily deployed and efficient in use, and that, ideally, could be retrofitted to existing PAR 64 lighting assemblies, thereby avoiding the necessity of out-of-service periods for rewiring and fitting of new lighting systems.

In addition to providing long service life and high efficiency, it would also be desirable for a retrofit assembly to have readily replaceable parts so as to minimize waste, time, and expense associated with periodic maintenance to sustain light-generating operation.

SUMMARY OF THE INVENTION

The present invention generally relates to high intensity discharge (HID) lamps and more specifically to a drop-in HID lamp assembly and retrofit method of deploying same, e.g., in aircraft lighting applications.

In one aspect, the invention relates to a retrofit HID lamp assembly adapted for use in a non-HID lighting receptacle that is constructed and arranged to receive a non-HID lamp assembly for the production of light, the retrofit HID lamp assembly comprising: (1) a housing compatible in size and shape with the receptacle, and having an interior; a housing compatible in size and shape with the receptacle, and having an interior; (2) a ballast unit disposed substantially within the housing; (3) a base terminal structure adapted to receive electrical inputs and communicatively coupled to the ballast unit; (4) a reflector disposed substantially within the housing and defining a reflector aperture; (5) a lens coupled with any of the housing and the reflector, wherein the lens and the reflector are arranged to bound portions of a reflector cavity disposed within the interior of the housing; and (6) an HID lamp having a light emissive portion that is removably insertable through the reflector aperture into the reflector cavity, having a base portion arranged for disposition outside the reflector cavity when the light emissive portion is disposed within the reflector cavity, and being electrically coupleable with the ballast unit via electrical contacts disposed on or in the base portion.

In another aspect, the invention relates to a method of retrofitting a non-HID lighting receptacle, comprising the step of replacing a non-HID lamp assembly with a retrofit HID lamp assembly described in the preceding paragraph.

In another aspect, the invention relates to a method of maintaining a retrofit HID lamp assembly as previously described but further containing a disengageable retaining element adapted to retain a HID lamp within the housing, the method comprising the steps of: disengaging the disengageable retaining element; removing the HID lamp from the housing; inserting a replacement HID lamp having a light emissive portion and a base portion into the housing, including inserting the light emissive portion of the replacement HID lamp through the reflector aperture into the reflector cavity; and re-engaging the disengageable retaining element to retain the replacement HID lamp within the housing.

In another aspect, the invention relates to a method of fabricating a retrofit HID lamp assembly, the method comprising the steps of: providing (A) a housing compatible in size and shape with the receptacle, and having an interior, (B) a base terminal structure coupled with the housing and adapted to receive electrical inputs, (C) a ballast unit disposed substantially within the housing, (D) a reflector disposed substantially within the housing and defining a reflector aperture, and (E) a lens coupled with any of the housing and the reflector, wherein the lens and the reflector are arranged to bound portions of a reflector cavity disposed within the interior of the housing; and inserting a light emissive portion of a HID lamp through the reflector aperture into the reflector cavity, while leaving a base portion of the HID lamp outside the reflector cavity.

In one aspect, the invention relates to a retrofit HID lamp assembly, for use in a non-HID lighting receptacle that is constructed and arranged to receive a non-HID lamp assembly to thereby form a lighting installation for the production of light, the retrofit HID lamp assembly including (i) a housing of a non-HID lamp assembly, (ii) a base terminal structure coupled with the housing, and compatible with such non-HID lighting receptacle, (iii) a ballast unit disposed in the interior of the housing, (iv) a reflector overlying the ballast unit in the interior of the housing, (v) an HID lamp mounted in the interior of the housing so that light generated by the HID lamp is reflected by the reflector, with the HID lamp being electrically coupled with the ballast unit, and (vi) a lens coupled with the housing.

A further aspect of the invention relates to a retrofit HID lamp assembly, for use in a PAR 64 lighting receptacle that is constructed and arranged to receive a PAR 64 lamp assembly to thereby form a lighting installation for the production of light, the retrofit HID lamp assembly including (i) a PAR 64 reflector, (ii) a base terminal structure coupled with the housing, and compatible with such PAR 64 lighting receptacle, (iii) a ballast unit disposed in the interior of the housing, (iv) a PAR 46 reflector overlying the ballast unit in the interior of the housing, (v) an HID lamp mounted in the interior of the housing so that light generated by the HID lamp is reflected by the PAR 46 reflector, with the HID lamp being electrically coupled with the ballast unit, and (vi) a lens coupled with the PAR 64 reflector.

A further aspect of the invention relates to a method of fabricating a retrofit HID lamp assembly, for use in a non-HID lighting receptacle that is constructed and arranged to receive a non-HID lamp assembly to thereby form a lighting installation for the production of light, the method including (i) providing a housing of a non-HID lamp assembly, (ii) coupling to the housing a base terminal structure that is compatible with such non-HID lighting receptacle, (iii) disposing a ballast unit in the interior of the housing, (iv) positioning a reflector to overlie the ballast unit in the interior of the housing, (v) mounting an HID lamp in the interior of the housing so that light generated by the HID lamp is reflected by the reflector, (vi) electrically coupling the HID lamp with the ballast unit, and (vi) coupling a lens with the housing.

Yet another aspect of the invention relates to a method of fabricating a retrofit HID lamp assembly, for use in a PAR 64 lighting receptacle, the method including (i) providing a PAR 64 reflector, (ii) coupling to the PAR 64 reflector a base terminal structure that is compatible with the PAR 64 lighting receptacle, (iii) disposing a ballast unit in the interior of the PAR 64 reflector, (iv) positioning a PAR 46 reflector to overlie the ballast unit in the interior of the housing, (v) mounting an HID lamp in the interior of the housing so that light generated by the HID lamp is reflected by the PAR 46 reflector, (vi) electrically coupling the HID lamp with the ballast unit, and (vi) coupling a lens with the housing.

Still another aspect of the invention relates to a method of retrofitting an aircraft lighting system including PAR 64 lamp articles, such method including replacing at least one of the PAR 64 lamp articles with a retrofit HID lamp assembly according to the present invention.

Other aspects, features and embodiments of the invention will be more fully apparent from the ensuing disclosure and appended claims.

DETAILED DESCRIPTION OF THE INVENTION, AND PREFERRED EMBODIMENTS THEREOF

Figure 1:
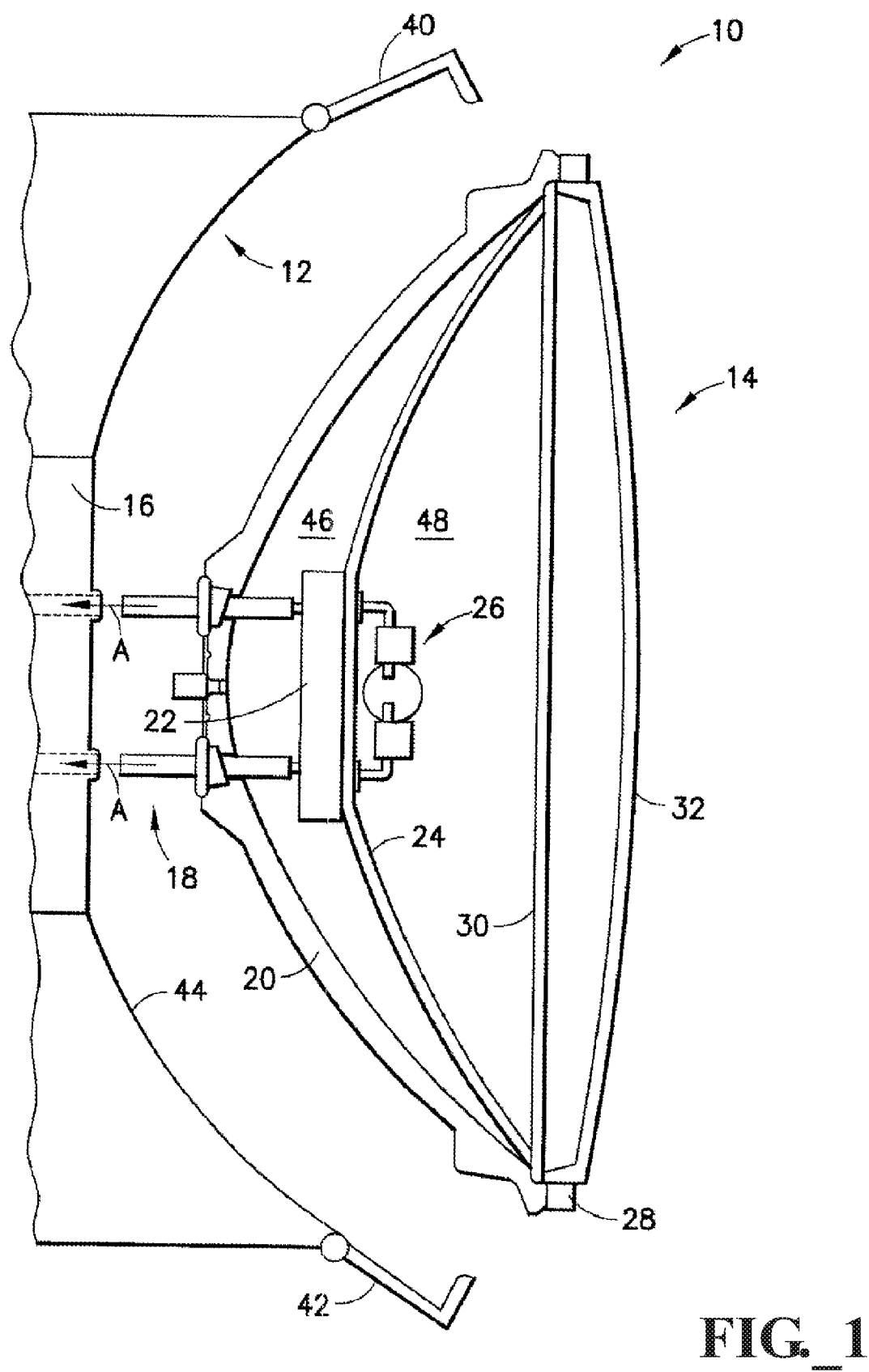
FIG. 1 is a schematic representation of a PAR 64 lighting installation in which a high intensity discharge lamp assembly according to a first embodiment of the present invention is being mounted.

The present invention generally relates to high intensity discharge (HID) lamps and more specifically to a drop-in HID lamp assembly and retrofit method of deploying same, e.g., in aircraft lighting applications.

In certain embodiments, the present invention is based on the discovery that HID lamp assemblies can be fabricated as a specific composite of HID lamp and PAR lamp componentry, to constitute a drop-in HID unit that can be substitutionally employed for PAR 64 lamp assemblies in PAR 64 lighting installations, without the need of rewiring and/or reconstruction of the lighting installation. In one embodiment, an HID lamp assembly of the invention is fabricated as a drop-in unit that allows an existing PAR 64 lighting installation to be retrofitted without modification of the aircraft.

Retrofit HID lamp assemblies according to the present invention take advantage of the superior operating performance and robust structural character of HID lamps, in comparison to filament-based (e.g., PAR 64) lamp assemblies. HID lamps have lifetimes exceeding 2000-4000 hours and they contain no filaments. Additionally, the burners of HID lamps are 3-4 times more efficient (e.g., in terms of lumens output per watt input) than incandescent halogen lamps, heat production per unit of light production is substantially lower, and the light beam source is much smaller—thereby enabling much better optical control of the light production.

"High intensity discharge (HID) lamps" as such term is used herein, are lamps that produce illumination when an arc of electrical energy is passed across an arc gap in a gaseous medium contained in the lamp. Such lamps typically use a ballast for generating an electrical charge and regulating voltage and current that is passed to a burner, or arc-generation device. Examples of HID lamps include, without limitation, metal halide lamps, compact metal halide lamps, pulse-start metal halide lamps, high pressure sodium lamps, low pressure sodium lamps, white high pressure sodium lamps and mercury vapor lamps. A preferred HID lamp includes a metal halide capsule comprising a quartz wall bounding an ionizable fill.

Utilization of an HID lamp in place of a conventional incandescent PAR 64 lamp in an exterior lighting installation of an aircraft enables the lighting system to be markedly improved toward the objective of not having to replace incandescent PAR lighting at frequent intervals during the service life of the aircraft. The issue with this change, however, is that the HID burner requires a ballast, and there is therefore need of down-time for the aircraft to be re-wired and fitted for this device. The numbers of aircraft currently in service that have exterior incandescent PAR lighting systems is very large, however, and such change therefore would require idling of significant numbers of aircraft in order to be upfitted to accommodate HID lamps.

In various embodiments, the present invention provides a drop-in replacement HID lamp assembly that is able to be implemented in existing incandescent PAR lamp installations, without modification to the aircraft.

In one embodiment, such result is achieved by a composite lamp assembly that utilizes a PAR 64 outer reflector housing as a shell for the lamp assembly structure having a concave surface defining an interior volume of the housing. An electronic ballast unit is mounted in the housing, e.g., in the interior volume, at an interior portion of the inner surface of the housing, in electrical contact with the base terminal structure of the lamp assembly. A PAR 46 reflector is mounted in the interior volume, overlying the electronic ballast unit. This reflector also has a concave surface, defining a sub-interior volume. An HID lamp unit is mounted in the sub-interior volume of the PAR 46 reflector. A lens is mounted over the PAR 46 reflector and secured to the PAR 64 reflector at a circumferential periphery of the lens, to form an enclosure containing the ballast unit, the PAR 46 reflector and the HID lamp unit.

The base terminal structure of such composite lamp assembly is selected to be identical to that of a PAR 64 Q4559X lamp assembly, so as to be coupleable with the mounting fixture of the aircraft lighting installation.

Such a composite lamp assembly, using a 50 watt HID PAR 46 lighting system, produces a higher light output than a Q4559X halogen lamp.

The preceding embodiment according to the invention thereby permits the fabrication, with commercially available components, of a novel retrofit lighting assembly that is compatible with, and readily mounted in, a conventional (incandescent) PAR 64 lamp assembly mounting receptacle of an aircraft exterior lighting system, without modification of the receptacle, wiring or associated on-board circuitry, power supplies, or other features of the existing lighting installation of the aircraft. Additionally, by retrofitting the existing PAR 64 lamp assembly mounting receptacles of the aircraft in such manner, with retrofit HID lamp assemblies of the present invention, the service life of the lamp assemblies in the retrofitted installation is substantially increased, e.g., by as much as two orders of magnitude or more, relative to corresponding lighting installations equipped with conventional incandescent PAR 64 lamp assemblies.

FIG. 1 is a schematic representation of a PAR 64 lighting installation 10 in which a high intensity discharge lamp assembly 14 according to a first embodiment of the present invention is being mounted in a PAR 64 receptacle 12.

The high intensity discharge lamp assembly 14 is a composite lamp assembly that preferably utilizes a PAR 64 outer reflector 20 as a shell or housing for the lamp assembly structure. The outer reflector housing 20 has a concave wall surface defining an interior volume 46 of the housing. An electronic ballast unit 22 is mounted in the housing, e.g., in the interior volume 46, in electrical contact with the base terminal 18 of the lamp assembly. A reflector 24, preferably a PAR 46 reflector, is mounted in the interior volume 46, overlying the electronic ballast unit 22. The PAR 46 reflector 24 also has a concave wall surface, defining a sub-interior volume 48. An HID lamp unit 26 is mounted in the sub-interior volume 48 of the PAR 46 reflector. A lens 28 including rear wall 30 and front wall 32 is mounted over the PAR 46 reflector 24 and secured to the PAR 64 reflector 20 at a circumferential periphery of the lens 28, to form an enclosure containing the ballast unit 22, the PAR 46 reflector 24 and the HID lamp unit 26.

The high intensity discharge lamp assembly 14 is shown in FIG. 1 as being mounted in a PAR 64 receptacle 12. The receptacle 12 includes a main body 16 defining a substantially concave cavity bounded by the surface 44 and generally conformable with the rear surface profile of the PAR 64 reflector 20. The receptacle 12 includes biased clips 40 and 42, which are pivotally mounted on the main body 16, and serve to positionally maintain the lamp assembly in place once it is installed in the receptacle.

The main body 16 of the receptacle 12 includes openings accommodating the base terminals 18 (shown as being inserted into the receptacle 12, by translation in the direction indicated by arrows A).

It is apparent from the foregoing description that the foregoing HID lamp assembly according to a first embodiment of the present invention provides a retrofittable illumination article that is compatible with a conventional PAR 64 receptacle, such as used in aircraft exterior lighting systems, e.g., for landing lights and taxi lights of the aircraft. No variation or modification of the existing structure of the aircraft is required, and the HID lamp assembly of the invention therefore may immediately be implemented in existing aircraft maintenance operations upon failure of previously installed PAR 64 lamp assemblies. As a result, a substantial increase in subsequent service life of the lighting article is achieved, with concomitant reduction in aircraft out-of-service time, maintenance time requirements, labor cost and maintenance personnel requirements, as compared to operation with a PAR 64 lamp assembly.

Figure 2:
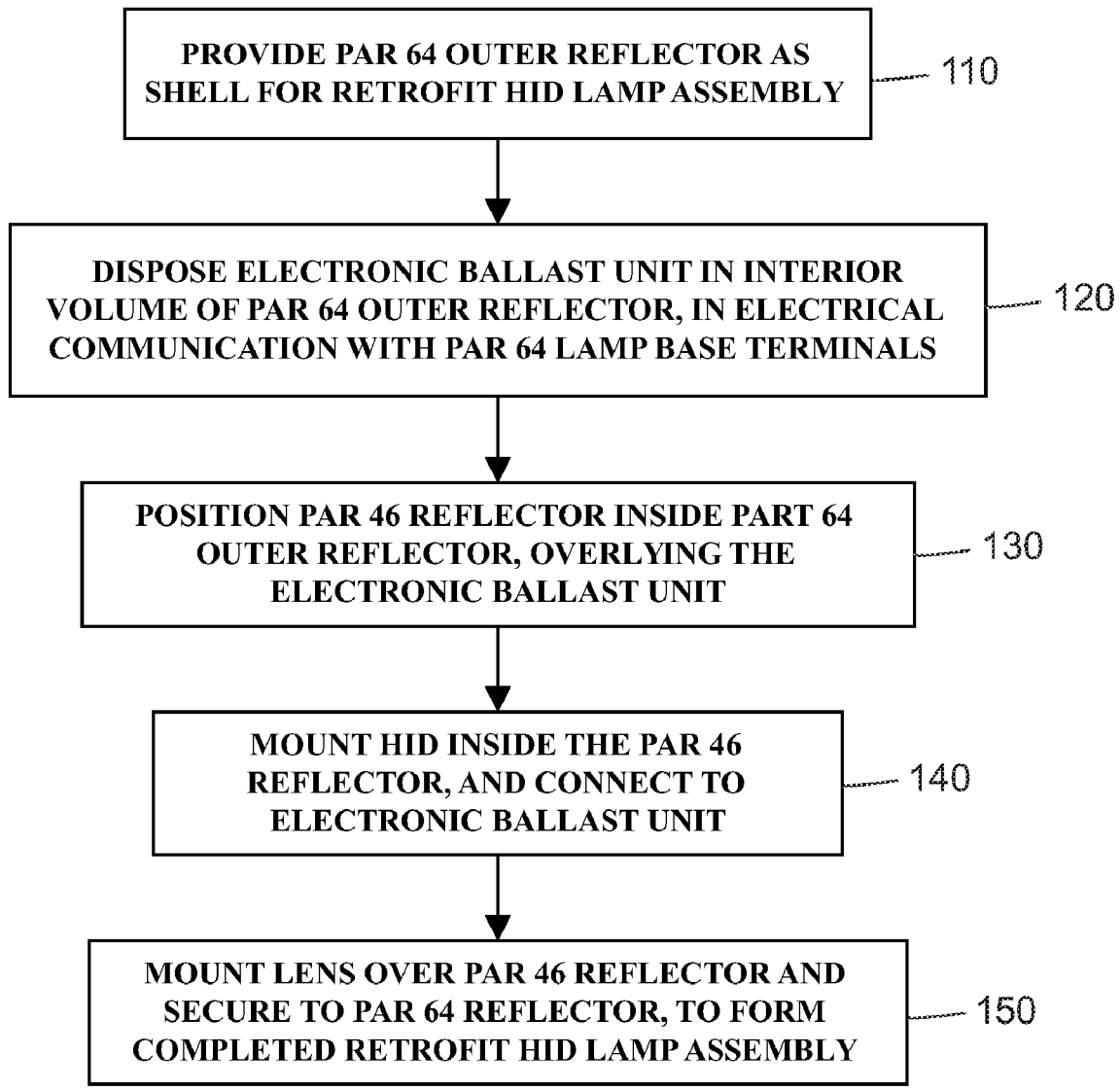
FIG. 2 is a flowsheet illustrating various steps of a method employable for fabricating a retrofit HID lamp assembly of the invention, for use in an existing PAR 64 lighting installation.

FIG. 2 is a flowsheet illustrating the steps employed for fabricating a retrofit HID lamp assembly of the invention, for use in an existing PAR 64 lighting installation.

The first step 110 of the fabricating method involves providing a PAR 64 outer reflector as a shell for the retrofit HID lamp assembly.

In the second step 120, a ballast unit is disposed in the interior volume of the PAR 64 reflector, in electrical communication with PAR 64 lamp base terminals.

Next, in step 130, a PAR 46 reflector, a reflector of smaller size than the PAR 64 reflector, is positioned inside the PAR 64 reflector, overlying the ballast unit.

An HID lamp unit then in step 140 is mounted inside the PAR 46 reflector, and connected to the ballast unit.

Finally, in step 150, a lens is mounted over the PAR 46 reflector and secured to the PAR 64 reflector, to form the completed HID lamp assembly, as a retrofit lighting article suitable for use in PAR 64 receptacles and lighting installations.

The various fabrication steps of the retrofit lighting article manufacture process have been described without reference to specific solders, bondants, adhesives, interconnect structures, couplings and the like, for simplicity of discussion, and the skilled artisan can readily select particular media, materials and mechanical/electrical fasteners without undue experimentation, as may be useful or suggest themselves for the specific application involved. In like manner, the specific HID lamp unit may be selected from among a wide variety of such lamp units, as commercially available.

Additionally, evacuation and sealing of the HID lamp assembly can be carried out during the manufacture of the HID lamp assembly, using vacuum pumps, fusion bonding equipment, and the like, as conventionally used in the manufacture of lighting articles of various types.

While the invention has been described herein in reference to PAR 64 reflector housing and PAR 46 internal reflector elements, it will be apparent that the principle of the invention may be implemented in other applications in which a relatively larger and a relatively smaller reflector may be utilized in the disclosed manner, with interconnection of an HID lamp unit to a ballast unit and to the base terminals of a non-HID lamp assembly, to provide a retrofit lighting article substitutionally compatible with existing non-HID lamp assemblies, to obviate the need for reconstruction or modification of existing electrical systems infrastructure. Particularly with regard to the internal reflector element, such reflector is preferably sized in a range of from about PAR 30 to about PAR 56 (i.e., about 3.75 inches to about 7 inches in diameter, or about 9.5 cm to about 17.8 cm in diameter); more preferably in a range of from about PAR 36 to about PAR 50 (i.e., about 4.5 inches to about 6.25 inches in diameter, or about 11.4 to about 15.9 cm in diameter); and more preferably still in a range from about PAR 38 to about PAR 46 (i.e., about 4.75 inches to about 5.75 inches in diameter, or about 12.1 cm to about 14.6 cm in diameter). In a further embodiment, the reflector is sized greater than about PAR 38—i.e., greater than about 4.75 inches or 12.1 cm in diameter. Such preferred sizes for the internal reflector element represent desirable balances between fitment within a desirable (e.g., PAR 64) receptacle while permitting packaging of internal components given sizing and heat transfer constraints, and provide sufficient light output for desirable applications such as exterior aircraft lighting.

Figure 3:
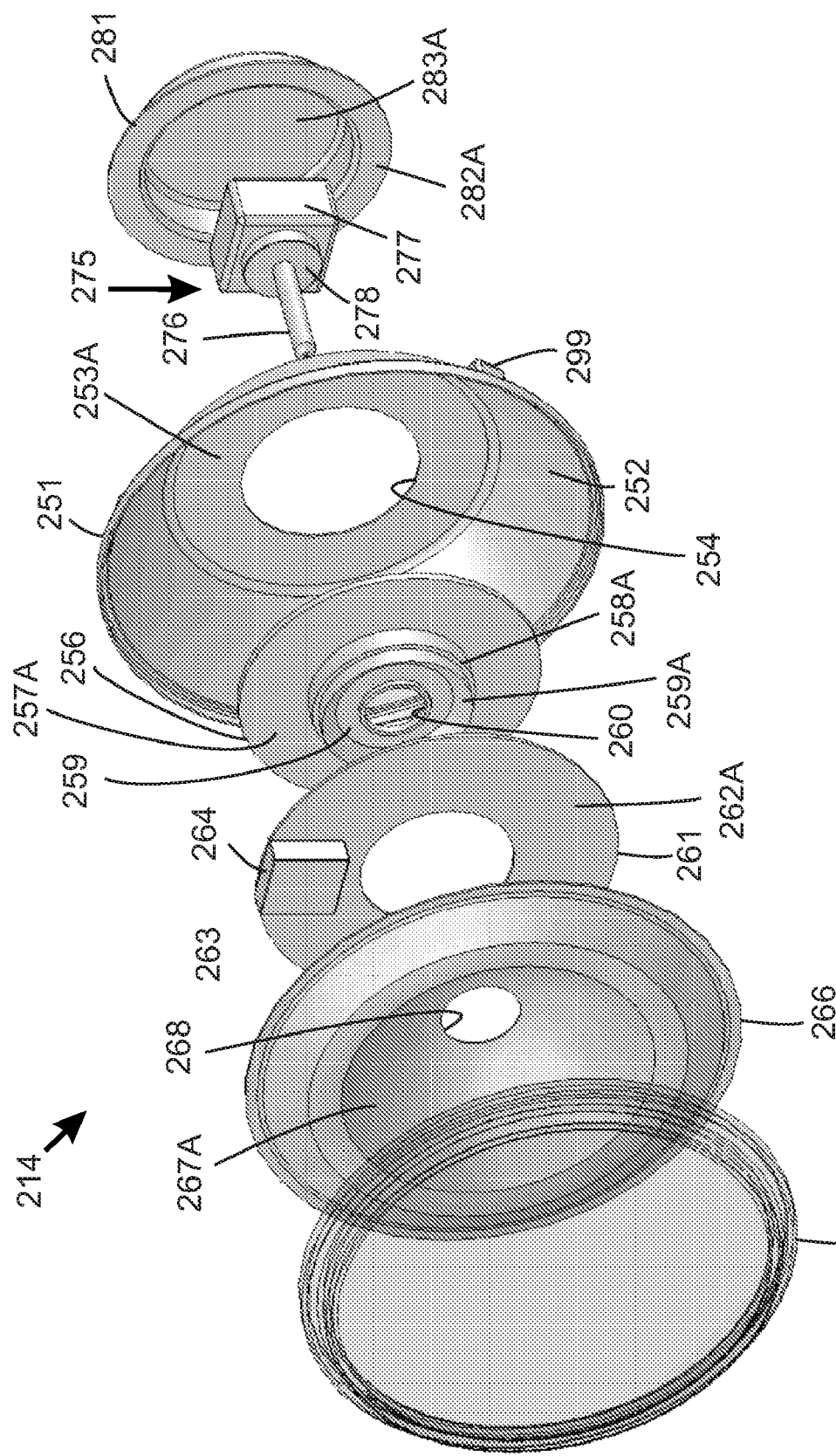
FIG. 3 is a fully exploded assembly perspective view of a retrofit HID lamp assembly according to a second embodiment of the present invention featuring a readily removable HID lamp having a light emissive portion that is insertable through apertures defined in a main housing, printed circuit board, and reflector.
Figure 4:
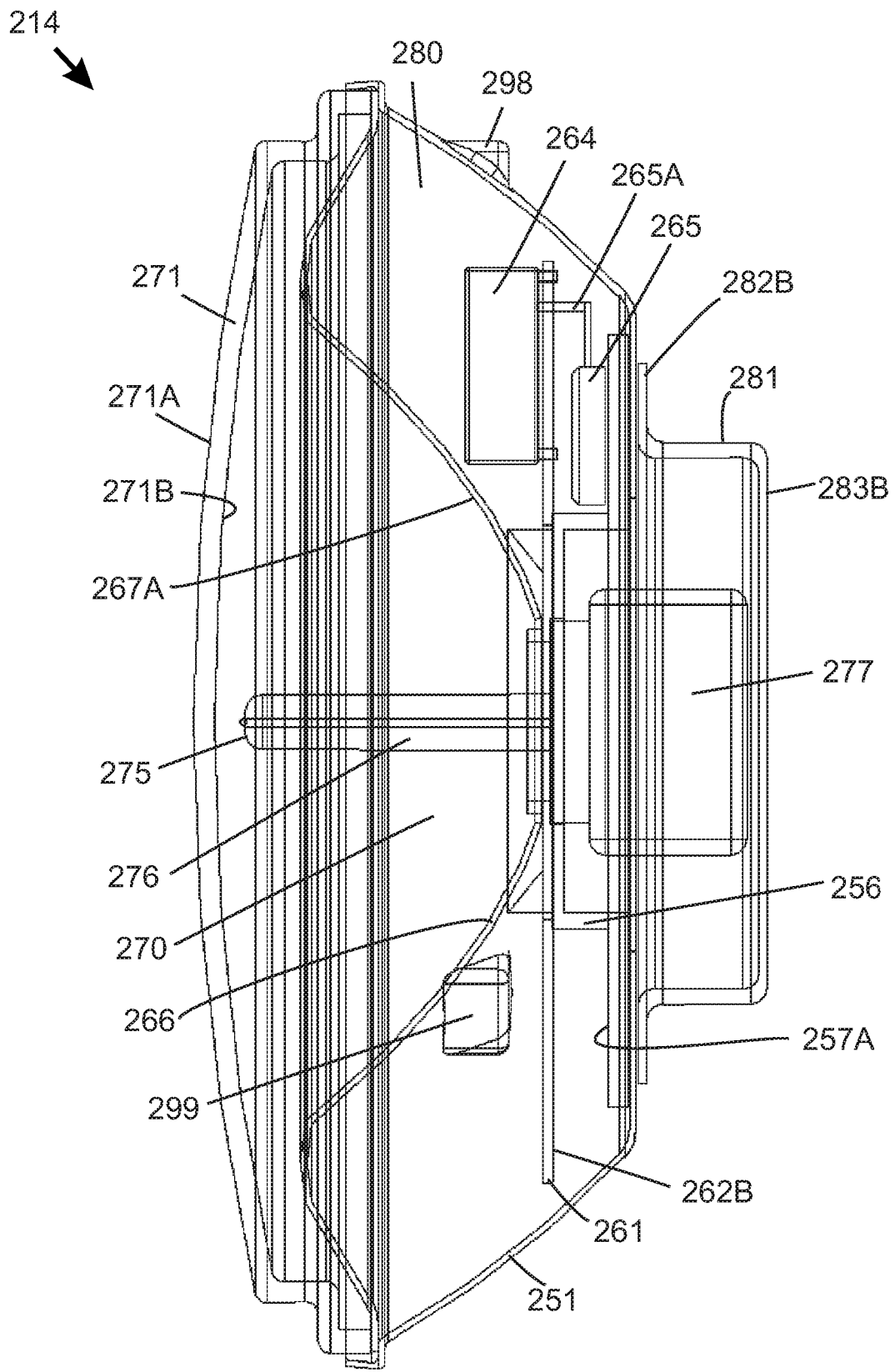
FIG. 4 is an assembled side external wireframe view of the retrofit HID lamp assembly of FIG. 3.
Figure 5:
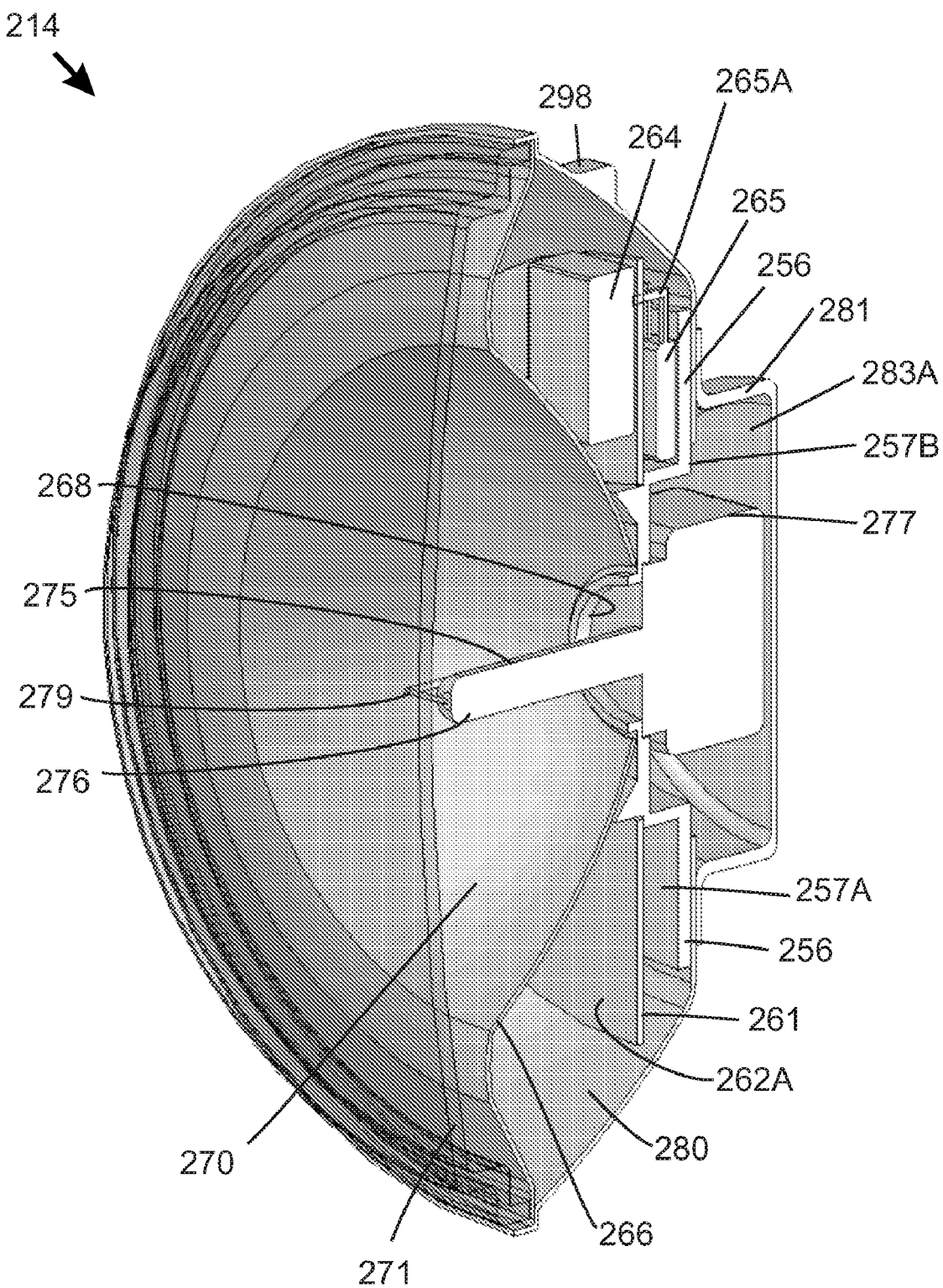
FIG. 5 is an assembled cutaway perspective view of the retrofit HID lamp assembly of FIGS. 3-4.
Figure 6:
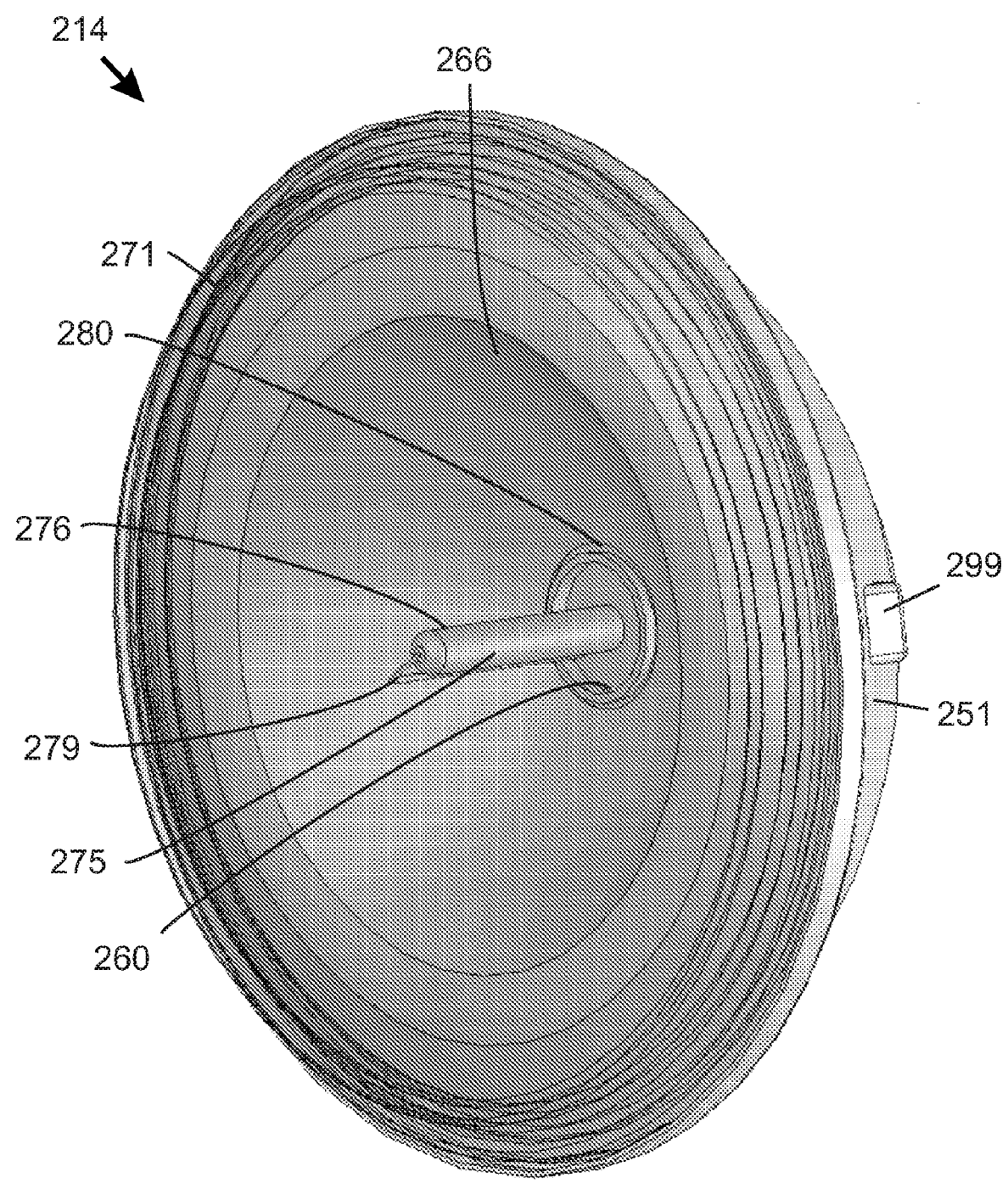
FIG. 6 is an assembled front exterior perspective view of the retrofit HID lamp assembly of FIGS. 3-5.

Another retrofit HID lamp assembly embodiment according to the present invention and providing still further advantages such as a readily replaceable HID lamp element is illustrated in FIGS. 3-8. Referring initially to FIG. 3, but in general to all such FIGS. 3-8, the assembly 214 is desirably adapted for use in a non-HID lighting receptacle such as an incandescent PAR 64 (or other desirable) receptacle. An elongated replaceable HID lamp 275 preferably has a light emissive portion 276, an exteriorly disposed conductor 279 (as illustrated in FIG. 5) exteriorly and a base portion 277 having a plug connector (not shown) including a plurality of electrical contacts for receiving power from an HID ballast, with at least the light emissive portion 276 being insertable into the assembly from a posterior end thereof. As is immediately apparent from FIG. 3, the four innermost components of the assembly 214—namely, the housing 251, main frame 256, printed circuit board 261, and reflector 266—each define an aperture (i.e., apertures 254, 260, 263, and 268) adapted to permit insertion of at least the light emissive portion 276 of the HID lamp 275 therethrough.

The housing 251, which may be formed of a PAR 64 reflector if desired, includes a flat rear wall having an anterior face 253A and a posterior face 253B, and a posteriorly-extending side wall 252. To provide pressure equalization within the housing 251 (as desirable for intermittent high altitude operation) without permitting detrimental moisture intrusion, the housing 251 preferably includes an air-permeable but water-impermeable vent (not shown). Such vent may include, for example, an aperture defined along the side wall 252 and sealed or otherwise covered with a porous sintered material, microporous mesh or membrane, or equivalent moisture-impermeable but air-permeable material.

Registration tabs 298, 299 (as illustrated in FIG. 4) or similar registration structures may be exteriorly disposed along the housing to promote alignment with corresponding recesses or other structures formed in a PAR receptacle into which the assembly 214 is to be inserted.

The housing 251 further defines an aperture 254 adapted to permit insertion of the HID lamp therethrough. Following such insertion, a rear cover 281 may be affixed to the housing 251 by any appropriate removable means such as threaded fasteners (not shown). The rear cover 281, which includes a rear wall having a central anterior face 283A and a posterior face 283B (as illustrated in FIG. 4), and includes an flared posterior portion having an annular posterior face 282 adapted to mate with the anterior face 253B of the housing 251, preferably with an annular gasket (not shown) disposed therebetween.

Figure 7:
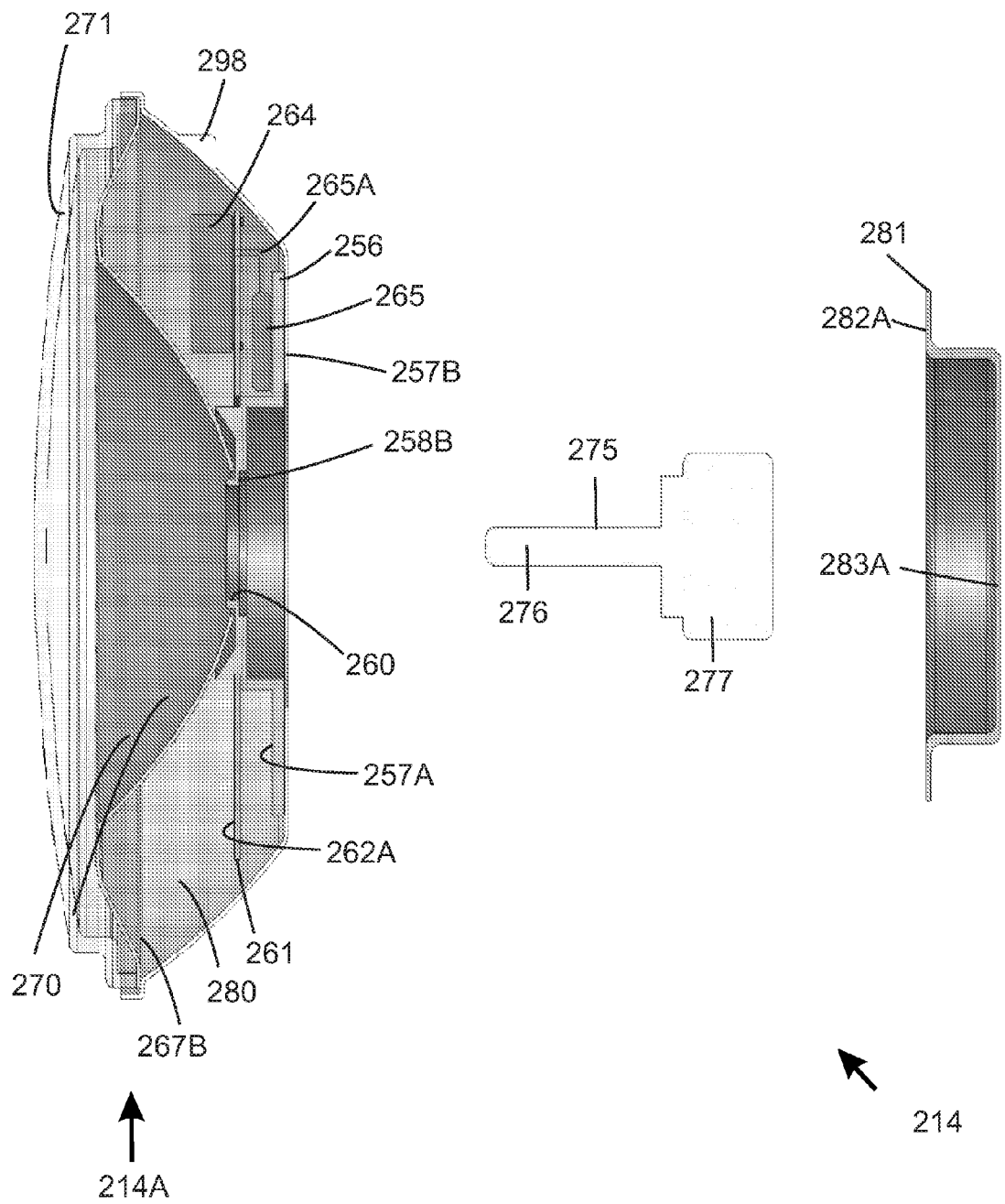
FIG. 7 is a partially exploded side cross-sectional view of the retrofit HID lamp assembly of FIGS. 3-6.
Figure 8:
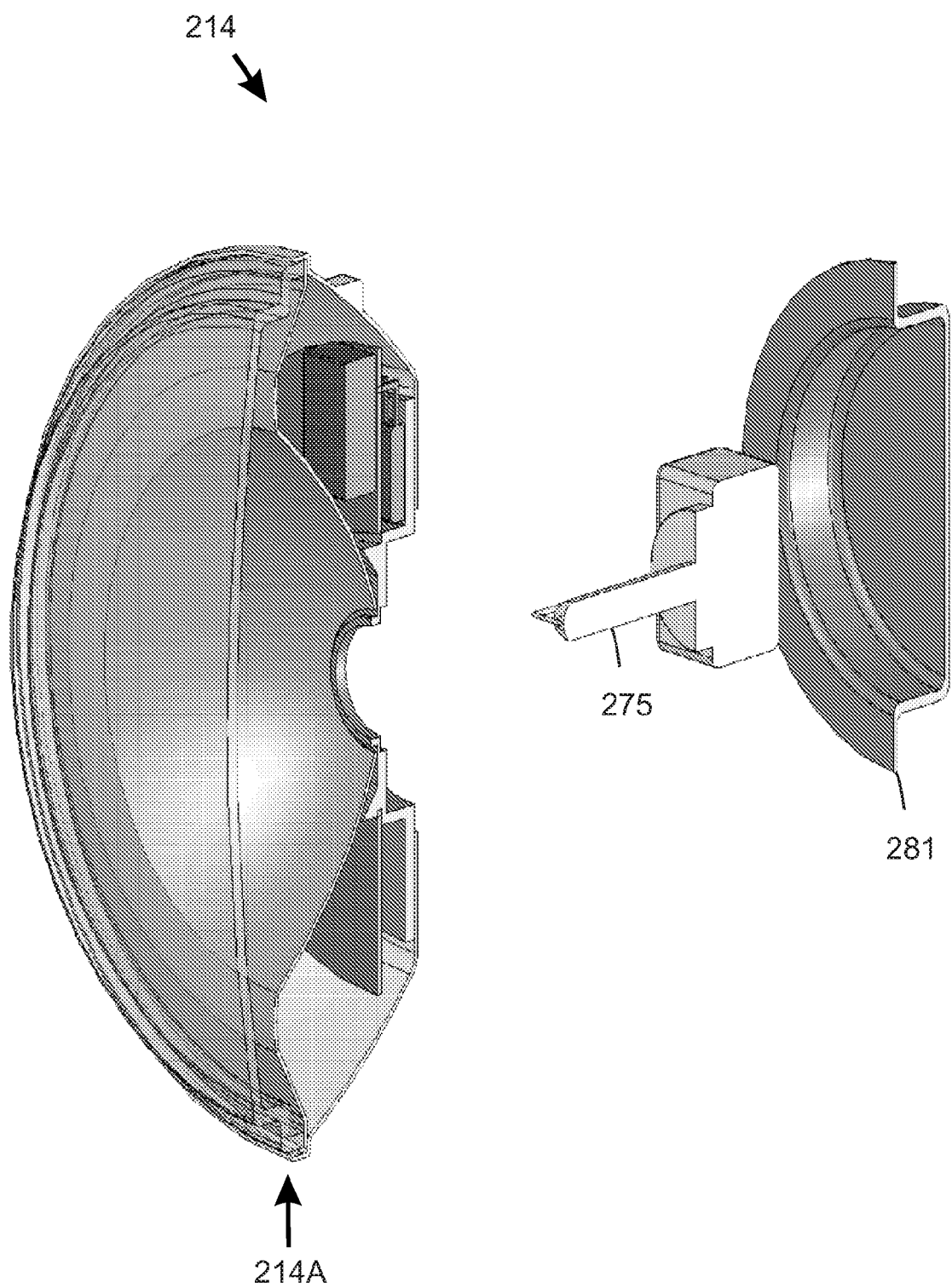
FIG. 8 is a partially exploded perspective cross-sectional view of the retrofit HID lamp assembly of FIGS. 3-7.

A centrally disposed main frame 256 preferably serves as common locus of attachment for several components of the assembly 214, including the housing 251, printed circuit board 257, and reflector 266, with such elements and the lens 271 being referable in combination as a subassembly (as illustrated at left in FIG. 8). The main frame 256 preferably comprises a metal or similarly thermally conductive material with good corrosion resistance, such as aluminum. Thee main frame 256 defines an aperture 260 (which is preferably located along a central axis thereof), an outer annular anterior face 257A, an outer annular posterior face 257B (as illustrated in FIG. 7), an anterior shoulder 258A, a posterior travel stop surface 258B (as illustrated in FIG. 7) adapted to engage a corresponding landing surface 278 of the HID lamp 275, and an interior anterior face 259 surrounded by a raised lip 259A, with the face 259 and raised lip 259A adapted to receive a central portion of the convex rear face 267B (as illustrated in FIG. 7) of the reflector 268. Threaded fasteners (not shown) are preferably used to removably join the HID lamp 275 to the frame, although other retaining elements may be used and/or integrated into the rear cover 281 to provide any of lamp retention and assembly sealing utility.

The printed circuit board (or "PCB") 261, which preferably comprises a FR-4 or similar insulating material, is disposed between the main frame 261 and the reflector 266. The primary function of the PCB 261 is to serve as a mounting substrate for the various components (e.g., a transformer 264 and power element(s) 265 such as may include various power transistors such as MOSFETs, and power diodes) of a HID ballast used to receive input power from an external source, then step up the voltage and control output power as appropriate to operate the HID lamp 275. The PCB 261 has an anterior face 262A and a posterior face 262B, and defines an aperture 263 that is sized and shaped to abut the anterior shoulder 258A of the main frame 256. The anterior face 262A preferably contains various (e.g., low current) timing and/or control circuit elements of the HID ballast. With the PCB aperture 263 being sized to engage the anterior shoulder 258A, the posterior face 262B is suspended apart from the anterior face 257A of the main frame 256. In this regard, high current power components 265 (as illustrated in FIGS. 4, 5, and 7) such as any transistor(s) and/or power diodes are desirably placed along or adjacent to the anterior face 262 to physically contact the outer annular posterior face 257A of the main frame 256, which abuts the (preferably thermally conductive) housing 251 to permit the frame/housing combination to serve as a heat sink for dissipating heat generated by the power components 265. Fins or other enhanced thermal dissipation elements (not shown) may be provided along any interior or exterior surface of the assembly 214 if desired to enhance heat transfer or dissipation. If necessary, any of the power components 265 may be suspended relative to the anterior face 262B with a conductive bridge 265A (as illustrated in FIG. 4) to ensure physical contact of the power components 265 with the anterior face 257A of the main frame 256.

A base terminal structure (not shown), such as may include screw terminals for terminating conductors or other contact elements, is preferably provided along the rear cover 281 to provide exterior access (although such base terminal structure may alternatively be provided along an exterior portion of the housing 251). Electrical contact between the internal PCB 256 and an interior portion (not shown) of the base terminal structure along the rear cover 281 is preferably made by multiple (e.g., three) conductors such as insulated wires (not shown) routed through one or more passages (not shown) defined in the main frame 256. Furthermore, electrical contact between the PCB 256 and the replaceable HID lamp 275 is preferably made by multiple (e.g., two) conductors such as insulated wires (not shown) routed through one or more passages (not shown) defined in the main frame 256 and terminating at a connector (not shown) adapted to removably engage a plug receptacle or other multi-contact structure (not shown) exteriorly disposed on or in the base portion 277 of the HID lamp 275.

A reflector 266 defining an aperture 268 overlies the PCB 261 and main frame 256 within the interior of the housing 251. The reflector 266 defines a concave anterior surface 267A that preferably comprises a reflective material or coating for focusing or otherwise directing light emitted from the light emissive portion 276 of the HID lamp 275 in an anterior direction. Facets (not shown) may be optionally provided on the concave anterior surface 267A of the reflector 266 to provide a desired optical interaction. As indicated previously, the reflector 266 is preferably sized in a range of from about PAR 30 to about PAR 56 (i.e., about 3.75 inches to about 7 inches in diameter, or about 9.5 cm to about 17.8 cm in diameter); more preferably in a range of from about PAR 36 to about PAR 50 (i.e., about 4.5 inches to about 6.25 inches in diameter, or about 11.4 to about 15.9 cm in diameter); and more preferably still in a range from about PAR 38 to about PAR 46 (i.e., about 4.75 inches to about 5.75 inches in diameter, or about 12.1 cm to about 14.6 cm in diameter). In a further embodiment, the reflector is sized greater than about PAR 38—i.e., greater than about 4.75 inches or 12.1 cm in diameter.

A lens 271 having an outer surface 271A and an inner surface 271B overlies the reflector 266, and may be joined to any of the reflector 266 and the housing 251 along peripheral portions thereof. The lens 271, which may be optionally faceted, may be fabricated from any suitable durable and optically transmissive material. Polymeric materials are preferably employed in fabricating the lens 271, such as to minimize weight of the assembly 214 (e.g., as compared to the use of glass for the lens 271).

Referring to FIG. 4, upon assembly, a reflector cavity 270 is defined between the posterior reflector surface 267A and the lens 271, with the light emissive portion 276 disposed substantially within the reflector cavity 270. Such reflector cavity 270 is desirably non-pressurized—in fact, such cavity 270 is preferably vented to atmosphere by way of the air-permeable and moisture impermeable vent described hereinabove. An posterior cavity 280 containing the PCB 261 and the main frame 256 is further defined between the posterior surface 267B of the reflector 266 and the housing 251. One or more vent holes (not shown) may be defined in the reflector 266 between the reflector cavity 270 and the posterior cavity 280 if necessary or desirable to promote ventilation of the reflector cavity by the vent port as described hereinabove.

With regard to materials of construction, aluminum and/or high temperature plastics (e.g., ULTEM® plastics, General Electric Company, Schenectady, N.Y.) are desirably used for major components of the assembly 214. Removable joining between members may be performed with any of various types of removable fasteners such as screws, whether or not sealably aided with gaskets. Permanent joining between members may be performed with epoxies or other adhesives, by way of ultrasonic or solvent welding, or equivalent joining techniques known to the skilled artisan.

In one embodiment, a lighting installation comprising a plurality of HID retrofit lamp assemblies as described herein may be provided. As mentioned previously, such HID retrofit lamp assemblies are advantageously deployed in an aircraft lighting system.

Retrofit of a non-HID lighting receptacle with an inventive lamp assembly as described herein may be performed rapidly, with little downtime to the aircraft or other lighting deployment system. Upon failure of a HID lamp in a retrofit assembly 214 as described hereinabove, maintenance is even simpler than retrofit, for example involving the steps of: disengaging a disengageable retaining element; removing a failed HID lamp from the housing; inserting a replacement HID lamp having a light emissive portion and a base portion into the housing, including inserting the light emissive portion of the replacement HID lamp through the reflector aperture into the reflector cavity; and re-engaging the disengageable retaining element to retain the replacement HID lamp within the housing. Such retaining element may include any of a rear cover element and any suitable type of mechanical fastener.

The HID retrofit assembly 214 according to the present embodiment provides the same advantages over incandescent PAR lamps as the assembly 14 according to the preceding embodiment, but with the further advantages of permitting easy replaceability of the HID lamp 275 without requiring replacement of the entire assembly (thus minimizing maintenance time, cost, and waste), and improved heat transfer characteristics to promote long life of electronic components associated with the PCB-mounted ballast.

In such manner, the invention affords a vast array of possible new uses of HID lighting in applications where less efficient non-HID lighting has heretofore been used. Extended service life and ease of maintenance are particularly attractive enhancements.

While the invention has been described herein with reference to specific features and illustrative embodiments, it will be recognized that the utility of the invention is not thus limited, but rather extends to and encompasses other features, modifications and alternative embodiments as will readily suggest themselves to those of ordinary skill in the art based on the disclosure and illustrative teachings herein. The claims that follow are therefore to be construed and interpreted as encompassing all such features, modifications and alternative embodiments within their spirit and scope.

What is claimed is:

1. A retrofit HID lamp assembly adapted for use in a non-HID lighting receptacle that is constructed and arranged to receive a non-HID lamp assembly for the production of light, the retrofit HID lamp assembly comprising: a housing compatible in size and shape with the receptacle, and having an interior; a ballast unit disposed substantially within the housing interior; a base terminal structure adapted to receive electrical inputs and communicatively coupled to the ballast unit; a reflector disposed substantially within the housing and defining a reflector aperture; a lens coupled with any of the housing and the reflector, wherein the lens and the reflector are arranged to bound portions of a non-pressurized reflector cavity disposed within the housing interior; and an HID lamp having a light emissive portion that is removably insertable through the reflector aperture into the non-pressurized reflector cavity, having a base portion arranged for disposition outside the non-pressurized reflector cavity when the light emissive portion is disposed within the non-pressurized reflector cavity, and being electrically coupleable with the ballast unit via electrical contacts disposed on or in the base portion.

2. The retrofit HID lamp assembly of claim 1, further comprising a disengageable retaining element adapted to retain or enclose the HID lamp within the housing.

3. The retrofit HID lamp assembly of claim 2, wherein the base terminal structure is disposed in or on the retaining element.

4. The retrofit HID lamp assembly of claim 1, wherein the housing includes a parabolic aluminized reflector lamp article housing.

5. The retrofit HID lamp assembly of claim 1, wherein the housing includes a PAR 64 lamp article housing.

6. The retrofit HID lamp assembly of claim 1, wherein at least a portion of the housing has a diameter of at least about 7 inches.

7. The retrofit HID lamp assembly of claim 1, wherein the reflector has a diameter in a range of between about 3.75 inches and about 7 inches.

8. The retrofit HID lamp assembly of claim 1, wherein the reflector has a diameter in a range of between about 4.5 inches and about 6.25 inches.

9. The retrofit HID lamp assembly of claim 1, wherein the reflector has a diameter in a range of between about 4.75 inches and about 5.75 inches.

10. The retrofit HID lamp assembly of claim 1, wherein the reflector has a diameter of greater than 4.75 inches.

11. The retrofit HID lamp assembly of claim 1, wherein the reflector has a diameter of at least about 5.75 inches.

12. The retrofit HID lamp assembly of claim 1, wherein the base terminal structure comprises a plurality of screw terminals.

13. The retrofit HID lamp assembly of claim 1, wherein the housing comprises an air-permeable and water vapor-impermeable vent.

14. The retrofit HID lamp assembly of claim 13, wherein the vent comprises a porous sintered material.

15. The retrofit HID lamp assembly of claim 1, further comprising printed circuit board disposed substantially within the housing and defining a PCB aperture, wherein the ballast unit is disposed on the printed circuit board, and the PCB aperture is adapted to permit the insertion of the light emissive portion therethrough.

16. The retrofit HID lamp assembly of claim 1, wherein the lens comprises a polymeric material.

17. The retrofit HID lamp assembly of claim 1, wherein any of the lens and the reflector is faceted.

18. The retrofit HID lamp assembly of claim 1, wherein the light emissive portion of the HID lamp comprises a metal halide capsule.

19. The retrofit HID lamp assembly of claim 18, wherein the metal halide capsule comprises a quartz wall bounding an ionizable fill.

20. The retrofit HID lamp assembly of claim 1, further comprising a main frame disposed substantially within and joined to the housing, and defining a main frame aperture, wherein the main frame aperture is adapted to permit the insertion of the light emissive portion therethrough.

21. The retrofit HID lamp assembly of claim 20, wherein the main frame comprises a travel stop surface disposed outside the non-pressurized reflector cavity and adapted to engage a corresponding landing surface of the base portion of the HID lamp.

22. The retrofit HID lamp assembly of claim 20, wherein the HID lamp is joined to the main travel stop with a removable fastening element.

23. The retrofit HID lamp assembly of claim 22, wherein the removable fastening element comprises at least one threaded fastener.

24. The retrofit HID lamp assembly of claim 20, wherein the main frame comprises a metal.

25. The retrofit HID lamp assembly of claim 24, further comprising a printed circuit board having mounted thereon at least one power circuit element selected from a transistor and a power diode, wherein the printed circuit board defines a PCB aperture adapted to permit the insertion of the light emitting portion therethrough, the printed circuit board is mounted to the main frame, and the at least one power circuit element is disposed in contact with the main frame.

26. The retrofit HID lamp assembly of claim 1, wherein the base portion of the lamp comprises a plug receptacle including the plurality of electrical contacts, the plug receptacle being adapted to removably engage a connector communicatively coupled with the ballast via a plurality of electrical conductors.

27. The retrofit HID lamp assembly of claim 1, wherein the reflector aperture is substantially centrally disposed in the reflector.

28. The retrofit HID lamp assembly of claim 2, wherein the lens is disposed along an anterior portion of the housing, and the disengageable retaining element comprises a cover plate disposed over a posterior portion of the housing.

29. The retrofit HID lamp assembly of claim 4, wherein the housing defines an aperture adapted to permit insertion of the light emissive portion therethrough.

30. The retrofit HID lamp assembly of claim 1, wherein the lens is disposed along an anterior portion of the housing, and the reflector is adapted to reflect toward the lens light emitted by the light emissive portion of the HID lamp.

31. The retrofit HID lamp assembly of claim 1, further comprising a main frame and a printed circuit board disposed within the housing interior, wherein:
   the housing defines a housing aperture;
   the main frame defines a main frame aperture;
   the printed circuit board defines a PCB aperture; and
   each of the housing aperture, the main frame aperture, the PCB aperture, and the reflector aperture is adapted to permit insertion of the light emissive portion therethrough.

32. A lighting installation comprising a plurality of retrofit HID lamp assemblies each according to the retrofit HID lamp assembly of claim 1.

33. An aircraft lighting system comprising at least one retrofit HID lamp assembly according to claim 1.

34. A method of retrofitting a non-HID lighting receptacle, comprising the step of replacing a non-HID lamp assembly with a retrofit HID lamp assembly according to claim 1.

35. The method of claim 34, wherein the lighting receptacle comprises a PAR 64 housing.

36. The method of claim 34, wherein the non-HID lighting receptacle is disposed on or in an aircraft.

37. A method of maintaining a retrofit HID lamp assembly according to claim 2, comprising the steps of: disengaging the disengageable retaining element; removing the HID lamp from the housing; inserting a replacement HID lamp having a light emissive portion and a base portion into the housing, including inserting the light emissive portion of the replacement HID lamp through the reflector aperture into the non-pressurized reflector cavity; and re-engaging the disengageable retaining element to retain the replacement HID lamp within the housing.

38. A method of fabricating a retrofit HID lamp assembly adapted for use in a non-HID lighting receptacle that is constructed and arranged to receive a non-HID lamp assembly for the production of light, the method comprising the steps of:
   providing (A) a housing compatible in size and shape with the receptacle, and having an interior, (B) a ballast unit disposed substantially within the housing, (C) a base terminal structure adapted to receive electrical inputs and communicatively coupled to the ballast unit, (D) a reflector disposed substantially within the housing and defining a reflector aperture, and (E) a lens coupled with any of the housing and the reflector, wherein the lens and the reflector are arranged to bound portions of a non-pressurized reflector cavity disposed within the interior of the housing; and inserting a light emissive portion of a HID lamp through the reflector aperture into the non-pressurized reflector cavity, while leaving a base portion of the HID lamp outside the non-pressurized reflector cavity.

39. The method of claim 38, further comprising the step of electrically coupling the HID lamp and the ballast unit via electrical contacts disposed on or in the base portion.

40. The method of claim 38, further comprising the step of utilizing a disengageable retaining element to retain the HID lamp within the housing.

41. The method of claim 38, wherein the housing comprises a PAR 64 housing.

42. A retrofit HID lamp assembly adapted for use in a non-HID lighting receptacle that is constructed and arranged to receive a non-HID lamp assembly for the production of light, the retrofit HID lamp assembly comprising:

a housing compatible in size and shape with the receptacle, and having an interior; a ballast unit disposed substantially within the housing interior;

a base terminal structure adapted to receive electrical inputs and communicatively coupled to the ballast unit;

a reflector disposed substantially within the housing and defining a reflector aperture;

a lens coupled with any of the housing and the reflector, wherein the lens and the reflector are arranged to bound portions of a reflector cavity disposed within the housing interior;

an HID lamp having a light emissive portion that is removably insertable through the reflector aperture into the reflector cavity, having a base portion arranged for disposition outside the reflector cavity when the light emissive portion is disposed within the reflector cavity, and being electrically coupleable with the ballast unit via electrical contacts disposed on or in the base portion; and a main frame disposed substantially within and joined to the housing, and defining a main frame aperture, wherein the main frame aperture is adapted to permit the insertion of the light emissive portion therethrough.

\* \* \* \* \*